(12) United States Patent
Meyer et al.

(10) Patent No.: US 11,225,244 B2
(45) Date of Patent: Jan. 18, 2022

(54) HYBRID VEHICLE ENGINE START AND SHIFT CONTROL STRATEGY

(71) Applicant: FORD GLOBAL TECHNOLOGIES, LLC, Dearborn, MI (US)

(72) Inventors: Jason Meyer, Canton, MI (US); Dushyant Palejiya, Canton, MI (US); Rajit Johri, Canton, MI (US); Yixin Yao, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 315 days.

(21) Appl. No.: 16/426,162

(22) Filed: May 30, 2019

(65) Prior Publication Data
US 2020/0377075 A1   Dec. 3, 2020

(51) Int. Cl.
*B60W 20/20* (2016.01)
*B60W 10/02* (2006.01)
*B60W 30/192* (2012.01)

(52) U.S. Cl.
CPC ............ *B60W 20/20* (2013.01); *B60W 10/02* (2013.01); *B60W 30/192* (2013.01); *B60W 2510/0638* (2013.01); *B60W 2510/081* (2013.01); *B60W 2520/10* (2013.01); *B60W 2710/02* (2013.01)

(58) Field of Classification Search
CPC .... B60W 20/20; B60W 10/02; B60W 30/192; B60W 2710/02; B60W 2510/0638; B60W 2510/081; B60W 2520/10; B60W 2710/083; B60W 2710/1005; B60W 2710/0644; B60W 2710/021; B60W 2540/10; B60W 2510/244; B60W 10/06; B60W 10/08; B60W 10/11; B60W 20/40; B60W 10/10; B60W 20/10; B60W 20/30; B60W 2710/0666; B60W 2710/081;
(Continued)

(56) References Cited

U.S. PATENT DOCUMENTS

| 8,983,694 B2 | 3/2015 | Tanishima et al. |
| 9,731,706 B2 | 8/2017 | Nefcy et al. |
| 10,183,566 B2 * | 1/2019 | Trent ..................... B60K 6/383 |

(Continued)

FOREIGN PATENT DOCUMENTS

| EP | 1640203 A1 * | 3/2006 | ............ B60W 10/10 |
| EP | 1640203 A1 | 3/2006 | |

*Primary Examiner* — Jonathan M Dager
*Assistant Examiner* — Jean W Charleston
(74) *Attorney, Agent, or Firm* — David B. Kelley; Brooks Kushman P.C.

(57) ABSTRACT

A system and method is disclosed for engine starting and transmission shifting where a controller may be operable to decrease a torque of a motor and operate a starter-generator (ISG) to start an engine responsive to a command to shift the transmission and start the engine. The controller may disengage a second clutch and subsequently shift the transmission to a target gear ratio speed responsive to the torque of the motor achieving zero. The controller may increase respective torques of the motor, ISG, and engine to drive a speed of the motor, ISG, and engine toward a target speed defined by the target gear speed responsive to completion of the shift. The controller may engage the second clutch responsive to the speed of the motor achieving the target speed and engage a disconnect clutch responsive to the respective speeds of the ISG and engine achieving the target speed.

16 Claims, 15 Drawing Sheets

(58) Field of Classification Search
CPC ........ Y02T 10/62; B60K 6/387; B60K 6/442;
B60Y 2400/421
USPC .......................................................... 701/22
See application file for complete search history.

(56) References Cited

U.S. PATENT DOCUMENTS

| | | | |
|---|---|---|---|
| 2008/0004780 A1* | 1/2008 | Watanabe | B60K 6/40 |
| | | | 701/54 |
| 2015/0112523 A1* | 4/2015 | Wang | B60W 10/06 |
| | | | 701/22 |
| 2016/0052511 A1* | 2/2016 | Takeuchi | B60K 6/48 |
| | | | 701/22 |
| 2016/0107633 A1* | 4/2016 | Liang | B60W 10/115 |
| | | | 701/22 |
| 2016/0221576 A1* | 8/2016 | Wang | B60W 30/14 |
| 2017/0036662 A1* | 2/2017 | Chen | B60W 20/12 |
| 2017/0259803 A1* | 9/2017 | Khafagy | B60W 20/13 |
| 2017/0259808 A1* | 9/2017 | Makled | B60K 6/547 |
| 2017/0259810 A1* | 9/2017 | Zhang | B60W 20/10 |

\* cited by examiner

HYBRID VEHICLE ENGINE START AND SHIFT CONTROL STRATEGY

TECHNICAL FIELD

The present disclosure relates to a control system for hybrid vehicles.

BACKGROUND

For a hybrid vehicle, difficulties may exist in coordinating an engine starting routine and coordinating the shifting of a transmission between different gear ratios. For large commercial hybrid vehicles that may include a large engine (e.g., a 6.2 Liter V-10 engine), significant power consumption by a starter-generator may be required to generate enough torque required to crank and start the large engine.

SUMMARY

A system and method is disclosed for engine starting and transmission shifting of a hybrid vehicle that includes a coaxially arranged engine, starter-generator, motor, and transmission gearbox. The hybrid vehicle may also include a disconnect clutch between the starter-generator and motor, and a second clutch between the motor and transmission gearbox. The second clutch may be a dog clutch.

A controller may be included that is operable to decrease a torque of the motor and operate the starter-generator to start the engine responsive to a command to shift the transmission gearbox and start the engine. The controller may also disengage the second clutch and subsequently shift the transmission gearbox to a target gear ratio speed responsive to the torque of the motor achieving zero. The controller may also increase respective torques of the motor, starter-generator, and engine to drive a speed of the motor, starter-generator, and engine toward a target speed defined by the target gear ratio speed responsive to completion of the shift. The controller may also engage the second clutch responsive to the speed of the motor achieving the target speed. The controller may further engage the disconnect clutch responsive to the respective speeds of the starter-generator and engine achieving the target speed.

The controller may also adjust a torque of the engine, a torque of the starter-generator, and the torque of the motor to satisfy a driver demanded torque responsive to the disconnect clutch being engaged. The controller may also be operable to adjust the speed of the engine and starter-generator toward the speed of the motor responsive to the command to start the engine and engage the disconnect clutch responsive to the engine and starter-generator achieving the speed of the motor.

The controller may further be operable to reduce a power reserved by a vehicle battery to charge the engine responsive to a vehicle speed being above a minimum transmission upshift value and command the engine be started responsive to a driver demanded torque being above an engine pull-up threshold. The controller may also be operable to reduce a power reserved by a vehicle battery to charge the engine responsive to a vehicle speed being above a minimum transmission upshift value and command the engine be started and the transmission gearbox be shifted responsive to a driver demanded torque being below an engine pull-up threshold.

The controller may also be operable to reduce a power reserved by a vehicle battery to charge the engine responsive to a vehicle speed being above a minimum transmission upshift value and command the motor propel the vehicle alone responsive to a driver demanded torque being below an engine pull-up threshold and the vehicle speed being below a maximum transmission upshift point. The controller may further be operable to reduce a power reserved by a vehicle battery to charge the engine responsive to a vehicle speed being above a minimum transmission upshift value and command the motor propel the transmission gearbox be shifted responsive to a driver demanded torque being below an engine pull-up threshold and the vehicle speed being above a maximum transmission upshift point.

The controller may also be operable to command the engine be started responsive to a vehicle speed being below a maximum transmission downshift value and responsive to a driver demanded torque being above an engine pull-up threshold. The controller may also be operable to command the motor alone propel a vehicle responsive to a vehicle speed being below a maximum transmission downshift value and responsive to a driver demanded torque being below an engine pull-up threshold.

The controller may also be operable to reduce a power reserved by a vehicle battery to charge the engine responsive to a vehicle speed being above a maximum transmission downshift value and command the engine be started and the transmission gearbox be shifted responsive to a driver demanded torque being above an engine pull-up threshold. The controller may also be operable to reduce a power reserved by a vehicle battery to charge the engine responsive to a vehicle speed being above a maximum transmission downshift value and command the engine be started responsive to a driver demanded torque being below an engine pull-up threshold.

The controller may also be operable to reduce a power reserved by a vehicle battery to charge the engine responsive to a vehicle speed being above a maximum transmission downshift value and command the transmission gearbox be shifted responsive to a driver demanded torque being below an engine pull-up threshold and responsive to the vehicle speed being below a minimum transmission downshift point. The controller may further be operable to reduce a power reserved by a vehicle battery to charge the engine responsive to a vehicle speed being above a maximum transmission downshift value and command the motor propel the vehicle responsive to a driver demanded torque being below an engine pull-up threshold and responsive to the vehicle speed being above a minimum transmission downshift point.

The controller may also be operable to command the engine be started responsive to a vehicle speed being above a maximum transmission downshift value and responsive to a driver demanded torque being above an engine pull-up threshold. The controller may further be operable to command the motor alone propel a vehicle responsive to a vehicle speed being above a maximum transmission downshift value and responsive to a driver demanded torque being below an engine pull-up threshold.

An alternative system and method is disclosed for engine starting and transmission shifting of a hybrid vehicle that includes a coaxially arranged engine, motor, and transmission gearbox. The hybrid vehicle may also include a disconnect clutch between the engine and motor, and a second clutch between the motor and transmission gearbox. The second clutch may be a dog clutch.

A controller may be operable to decrease a torque of the motor and begin engaging the disconnect clutch to start the engine responsive to a command to shift the transmission gearbox and start the engine. The controller may also be operable to disengage the disconnect clutch responsive to the engine being started and disengage the second clutch and subsequently shift the transmission gearbox to a target gear ratio speed responsive to the torque of the motor being, reduced. The controller may also be operable to increase respective torques of the motor and engine to drive a speed of the motor and engine toward a same target speed defined by the target gear ratio speed responsive to completion of the shift. The controller may also be operable to engage the second clutch responsive to the speed of the motor achieving the target speed. The controller may further be operable to engage the disconnect clutch responsive to the respective speeds of the engine achieving the target speed.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
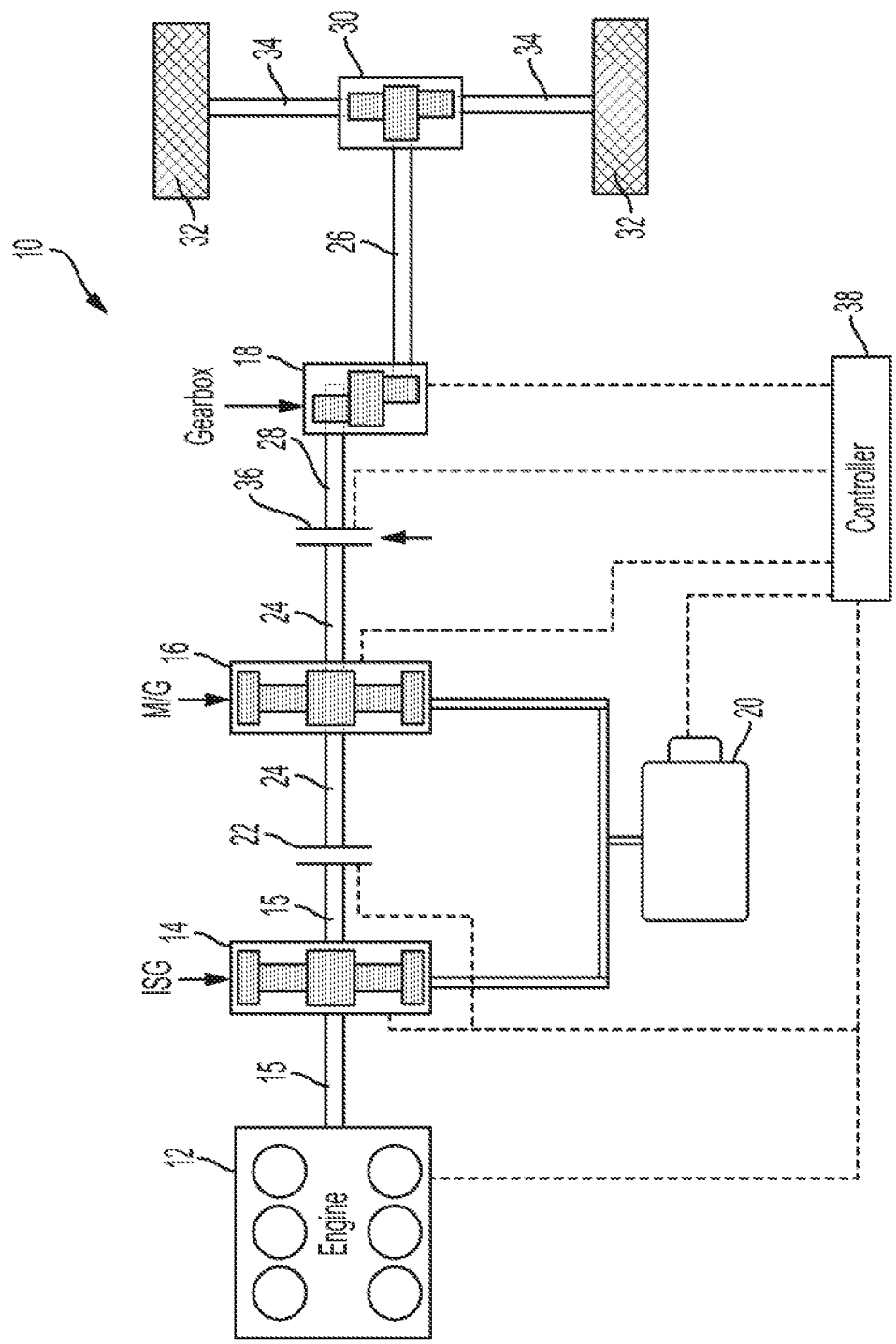
FIG. 1 is a schematic illustration of a representative powertrain of a hybrid vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 may include an engine 12 and an electric machine such as an integrated starter-motor/generator (TSG) 14. As shown, the ISG 14 may be positioned on the crankshaft and connected to the flywheel of the engine 12. It is contemplated that shaft 15 may extend through the ISG 14. It is also contemplated that ISG 14 may not be positioned on shaft 15 but may instead be connected to the flywheel of the engine 12 using a belt or gearing mechanism. The HEV 10 may also include an electric machine such as an electric motor/generator (M/G) 16, a multiple step-ratio gearbox 18, and a high-voltage battery 20.

The engine 12 and the W/G 16 may both be configured as drive sources to propel the HEV 10. The engine 12 generally represents a power source that may include an internal combustion engine such as a gasoline, diesel, or natural gas powered engine, or a fuel cell. The engine 12 generates an engine power and corresponding engine torque that is supplied to the M/G 16 when a disconnect clutch 22 between the engine 12 and the M/G 16 is at least partially engaged. The M/G 16 may be implemented by any one of a plurality of types of electric machines. For example, MIG 16 may be a permanent magnet synchronous motor. Power electronics condition direct current (DC) power provided by the battery 20 to the requirements of the M/G 16, as will be described below. For example, power electronics may provide three-phase alternating current (AC) to the M/G 16.

When the disconnect clutch 22 is at least partially engaged, power flow from the engine 12 to the NUG 16 or from the M/G 16 to the engine 12 is possible. For example, a disconnect clutch 22 may be engaged and M/G 16 may operate as a generator to convert rotational energy provided by the shaft 15 and the shaft 24 into electrical energy to be stored in the battery 20. The disconnect clutch 22 can also be disengaged to isolate the engine 12 allowing the M/G 16 to operate as the sole drive source for the HEV 10. It is contemplated that shalt 24 may extend through the M/G 16. The M/G 16 may be drivably connected to the shaft 24, whereas the engine 12 may be drivably connected to the shaft 24 only when the disconnect clutch 22 is at least partially engaged.

The ISG 64 may be configured to operate as a motor to start the engine 12 during an engine start-up event, or to provide additional torque to propel HEV 10. The ISG 14 may also be configured to receive torque from the engine 12 and operate as a generator for providing electrical energy to charge the battery 20.

It is contemplated that gearbox 18 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between an output shaft 26 and an input shaft 28. The gearbox 18 is automatically shifted from one ratio to another based on various vehicle and ambient operating conditions by an associated controller, such as a powertrain control unit (PCU). Power and torque from both the engine 12, the ISG 14, and the M/G 16 may be delivered to and received by gearbox 18. The gearbox 18 may then provide output power and torque to the output shall 26.

It should be understood that any multiple ratio gearbox that accepts input torque(s) from an engine and/or a motors and then provides torque to the output shaft 26 at the different ratios is acceptable for use with embodiments of the present disclosure. For example, gearbox 18 may be implemented by an automated mechanical (or manual) transmission (AMT) that includes one or more servo motors to translate rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 26 is connected to a differential 30. The differential 30 drives a pair of wheels 32 via respective axles 34 connected to the differential 30. The differential transmits approximately equal torque to each wheel 32 while permitting slight speed differences such as when the vehicle turns a corner. Different types of differentials or similar devices may be used to distribute torque from the powertrain to one or more wheels. In some applications, torque distribution may vary depending on a particular operating mode or condition, for example.

A clutch 36 may further be positioned between the gearbox 18 and M/G 16. It is contemplated that clutch 36 may be a "dog" clutch or any other type of automotive mechanical interlocking clutch mechanism. When the clutch 36 is engaged and disconnect clutch 22 is disengaged, the M/G 16 may operate as the sole drive source for the HEAT 10. When clutch 36 and disconnect clutch 22 are both engaged, the HEV 10 may operate any combination of the engine 12, ISG 14, and/or M/G 16 to power the HEV 10. It is contemplated that clutch 36 may be disengaged to decouple the engine 12, ISG 14 and/or the M/G 16 from the input shaft 28 when gearbox 18 is being shifted between differing gear ratios or when gearbox 18 is positioned in a "park" or "neutral" position.

The HEV 10 may further includes an associated controller 38 such as a powertrain control unit (PCU), engine control unit (ECU) or the like. While illustrated as one controller, the controller 38 may be part of a larger control system and may be controlled by various other controllers throughout the HEV 10, such as a vehicle system controller (VSC). It should therefore be understood that the controller 38 and one or more other controllers can collectively be referred to as a "controller" that controls various actuators in response to signals from various sensors to control functions such as starting/stopping the engine 12; operating ISG 14 to provide wheel torque or charge the battery 20; operating 16 to provide wheel torque or charge the battery 20; engage/disengage disconnect clutch 22 and clutch 36; or operate gearbox 18 to select/schedule transmission gear ratio shifts.

Controller 38 may include a microprocessor or central processing unit (CPU) in communication with various types of computer readable storage devices or media Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated by the dashed lines, controller 38 may communicate signals to and/or from: engine 12; ISG 14; disconnect clutch 22; M/G 16; battery 20; clutch 36; and the gearbox 18. Although not explicitly illustrated, those of ordinary skill in the art will recognize various functions or components that may be controlled by controller 38 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, ISG 14 and M/G 16 operation, clutch pressures for disconnect clutch 22, clutch 36, and the gearbox 18, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (ION), throttle valve position (IP), air temperature (IMP), exhaust gas oxygen (EGO) or other exhaust gas component concentration or presence, intake air flow (MAF), transmission gear, ratio, or mode, transmission oil temperature (TOT), transmission turbine speed (TS), deceleration or shift mode (MDE), battery temperature, Nonage, current, or state of charge (SOC) for example.

Control logic or functions performed by controller 38 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 38. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal (not shown) is used by the driver of the vehicle to provide a demanded torque, power, or drive command to propel the vehicle. In general, depressing and releasing the accelerator pedal generates an accelerator pedal position signal that may be interpreted by the controller 38 as a demand for increased power or decreased power, respectively. A brake pedal (not shown) is also used by the driver of the vehicle to provide a demanded braking torque to slow the vehicle. In general, depressing and releasing the brake pedal generates a brake pedal position signal that may be interpreted by the controller 38 as a demand to decrease the vehicle speed. Based upon inputs from the accelerator pedal and brake pedal, the controller 38 commands the torque to the engine 12, ISG 14, and M/G 16. The controller 38 also controls the timing of gear shifts within the gearbox 18, as well as engagement or disengagement of the disconnect clutch 22 and the clutch 36.

To drive the vehicle with the engine 12 and/or ISG 14, the disconnect clutch 22 is at least partially engaged to transfer at least a portion of the engine/ISG torque through the disconnect clutch 22 to the M/G 16, and then from the M/G 16 through the clutch 36 and gearbox 18. The M/G 16 may assist the engine 12 or ISG 14 by providing additional power to turn the input shaft 28. This operation mode may be referred to as a "hybrid mode" or an "electric assist mode."

To drive the vehicle with the M/G 16 as the sole power source, the power flow remains the same except the disconnect clutch 22 isolates the engine 12 and TSG 14 from the shaft 24. Combustion in the engine 12 may be disabled or otherwise OFF during this time to conserve fuel. The battery 20 may operate to transmit stored electrical energy to power electronics that may include an inverter, for example. The power electronics may operate to convert DC voltage from the battery 20 into AC voltage to be used by the M/G 16. The controller 38 commands the power electronics to convert voltage from the battery 20 to an AC voltage provided to the M/G 16 to provide positive or negative torque to the shaft 24. This operation mode may be referred to as an "electric only" or "EV" operation mode.

In any mode of operation, the M/G 16 may act as a motor and provide a driving force for the HEV 10. Alternatively, the M/G 16 may act as a generator and convert kinetic energy into electric energy to be stored in the battery 20. The M/G 16 may act as a generator while the engine 12 is providing propulsion power for the HEV 10, for example. The M/G 16 may additionally act as a generator during times of regenerative braking in which torque and rotational (or motive) energy or power from spinning, wheels 32 is transferred back through the gearbox 18 and clutch 36 and is converted into electrical energy for storage in the battery 20.

The battery 20 and the MIG 16 may also be configured to provide electrical power to one or more vehicle accessories. The vehicle accessories may include, but are not limited to, air conditioning systems, power steering systems, electric heaters, or any other system or device that is electrically operated.

The controller 38 may be configured to receive various states or conditions of the various vehicle components. The electrical signals may be delivered to the controller 38 from the various components via input channels. Additionally, the electrical signals received from the various components may be indicative of a request or a command to change or alter a state of one or more of the respective components of the HEV 10. The controller 38 may include output channels that are configured to deliver requests or commands (via electrical signals) to the various vehicle components. The controller 38 may include control logic and/or algorithms that are configured to generate the requests or commands delivered through the output channels based on the requests, commands, conditions, or states of the various vehicle components.

The architecture illustrated in FIG. 1 is merely representative and is not intended to be limiting. Other configurations are contemplated that utilize selective engagement of both an engine and a motor to transmit power through the transmission. For example, the ISG 14 and/or the M/G 16 may be offset from the crankshaft. Other configurations are contemplated without deviating from the scope of the present disclosure.

It is contemplated that the configuration of HEV 10 may be advantageous as it provides extremely high torque capabilities over other hybrid vehicle configurations. However, for large commercial vehicles (e.g., a vehicle with a 6.2 Liter, V-10 engine), the HEV 10 may need large amounts of torque to crank and start engine 12. To quickly crank such a larger engine, the ISG 14 may demand tens of thousands of watts of power. Controller 38 would therefore need to reserve enough power to ensure the engine 12 can be quickly started during EV operation. Generally, the power available to propel the vehicle in EV mode might be the battery discharge power minus any accessory power (e.g., DC/DC converter, electric A/C, etc.) and the engine starting power reserve. For larger commercial vehicles the weight and large engine starting power reserve would generally result in limited EV mode capability.

Also, larger commercial vehicles might experience setbacks for gearbox 18 because torque cannot be transmitted to the Wheels 32 during a transmission shift. For instance, a transmission shift may require: (1) the torque of M/G 16 (and the net torque of engine 12 and ISG 14 if disconnect clutch 22 is engaged) be ramped to zero; (2) disengaging clutch 36; (3) gearbox 18 being shifted into a new gear ratio; (4) M/G 16 being commanded into speed control; (5) the torque of M/G 16 being applied to change the motor speed of MIG 16 from the synchronous speed of the original gear to the synchronous speed of the target gear; (6) engaging the clutch 36; and (7) the torque of M/G 16 (and the net torque of engine 12 and ISG 14 if disconnect clutch 22 is engaged) being ramped to meet the torque requested by a driver (i.e., driver demanded torque) via the accelerator and/or brake pedals. This process may require significant time (e.g., 2 seconds or more) to complete. Although the EV mode capability may be limited, controller 38 might be capable of commanding the HEV 10 to accelerate to a high enough speed that the gearbox 18 has to upshift to high gear to prevent the M/G 16 from over-speeding.

It is contemplated that by coordinating starting of engine 12 and shifting of the gearbox 18 it may be possible to improve the EV capability and to improve overall drivability of HEV 10. But with transmission shifting being necessary, the gearbox 18 may need to upshift to a higher gear to prevent the M/G 16 and/or the ISG 14 and the engine 12 from over-speeding. While such shifting of the gearbox 18 may be necessary, the starting of the engine 12 and the shifting events of the gearbox 18 can be combined into a single event without extending the event duration beyond a normal shifting event.

Figure 2A:
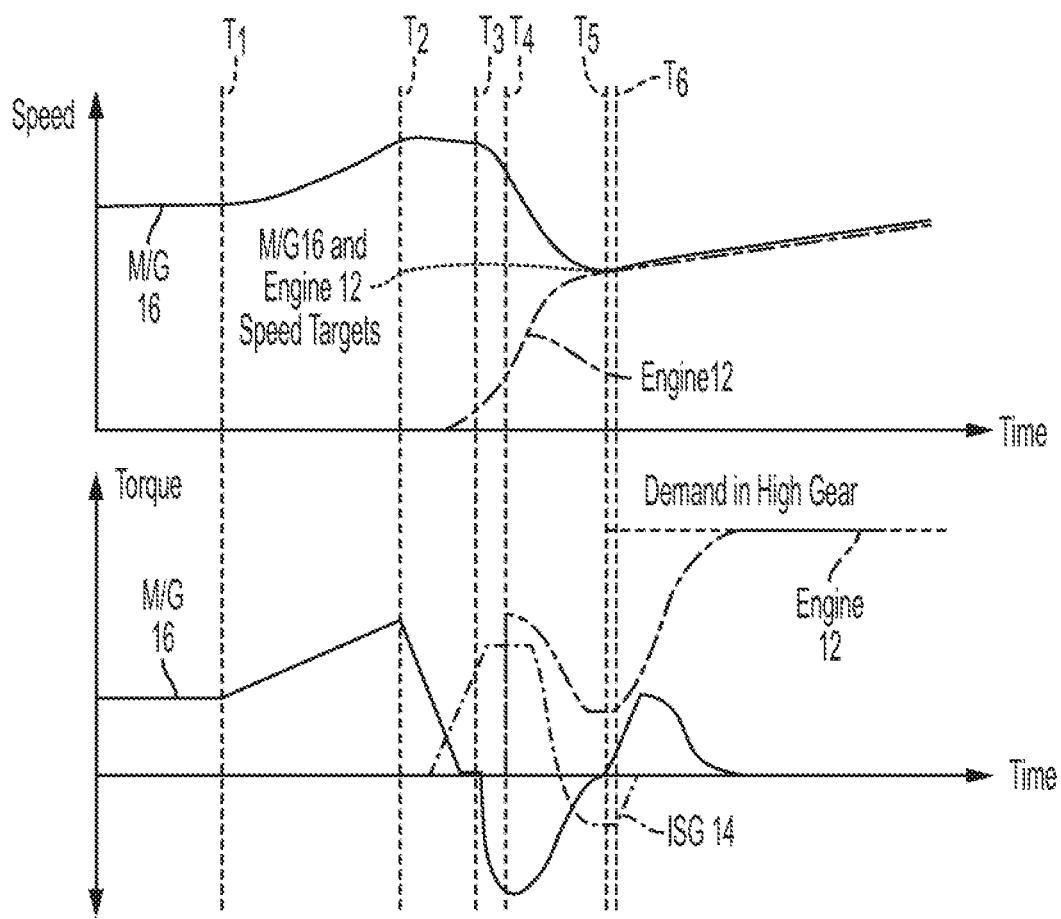
FIG. 2A is a control diagram illustrating a first method for determining a coordinated engine start and transmission gear ratio upshift.

Executing a coordinated transmission shift of gearbox 18 and starting of the engine 12 may require several steps but the steps may be performed in parallel, so the duration of the combined event may operate like a regular transmission shift. FIG. 2A illustrates a transmission upshift of the gearbox 18 according to one embodiment where the engine 12 is not operating and disconnect clutch 22 is disengaged. Prior to $T_1$ the HEV 10 may be propelled by torque provided by M/G 16 alone (i.e., EV mode). At $T_1$ the driver may begin to depress the accelerator pedal. As shown by the period between $T_1$ and $T_2$, the controller 38 may increase the torque output of M/G 16. The controller 38 may monitor and determine if the torque demand exceeds an engine pull-up threshold (i.e., a threshold for when the engine should be started). At $T_2$, the controller 38 may determine the torque demand has exceeded the engine pull-up threshold and a coordinated engine start and transmission shift routine is executed.

As shown by the period between $T_2$ and $T_3$, the coordinated start and shift routine may first decrease the torque of M/G 16 toward zero as quickly as possible as the driveline can handle and to reduce any noise-vibration-harshness (NVH) problems. As the torque of M/G 16 is reduced, power becomes available to crank the engine 12 using the ISG 14. In other words, the controller 38 may be able to crank the engine 12 with more torque/power because the torque of M/G 16 is being reduced to zero. At $T_3$, the torque of M/G 16 has been reduced to zero and the controller 38 will disengage the clutch 36 so that input shaft 28 is disconnected from shaft 24. Once clutch 36 is disengaged, the gearbox 18 engages the new target gear and the controller 38 commands the M/G 16 into speed control. Once speed control has been entered, the controller 38 may set the speed target to the synchronous speed of the new target gear.

As is also shown by the period between $T_2$ and $T_3$, the torque of ISG 14 may begin to increase in order to generate enough torque and power to crank and generate a first combustion of the engine 12 within a short time period. First combustion is shown as occurring at $T_3$, and the controller 38 will then command the ISG 14 into speed control and the speed target of ISG 14 is also set to the synchronous speed of the new target gear of the gearbox 18. Since the engine 12 and ISG 14 are capable of accelerating their combined inertia, the controller 38 can ensure that the engine 12 reaches the target speed at the same time the M/G 16 approximately reaches the target speed, Once the controller 38 has determined that the speeds of the engine 12. ISG 14, and MIG 16 are synchronized with the new target gear, the controller 38 may engage clutch 36 (as shown by $T_5$) and disconnect clutch 22 (as shown by $T_6$). It is contemplated that controller 38 may engage clutch 36 and disconnect clutch 22 at the same time or sequentially. For instance, controller 38 may engage clutch 36 first and then proceed 10 engage disconnect clutch 22. Or controller may engage disconnect clutch 22 and then proceed to engage clutch 36. Once controller 38 has engaged clutch 36, the torque of the engine 12 and M/G 16 may be increased to begin delivering the driver demand.

Figure 2B:
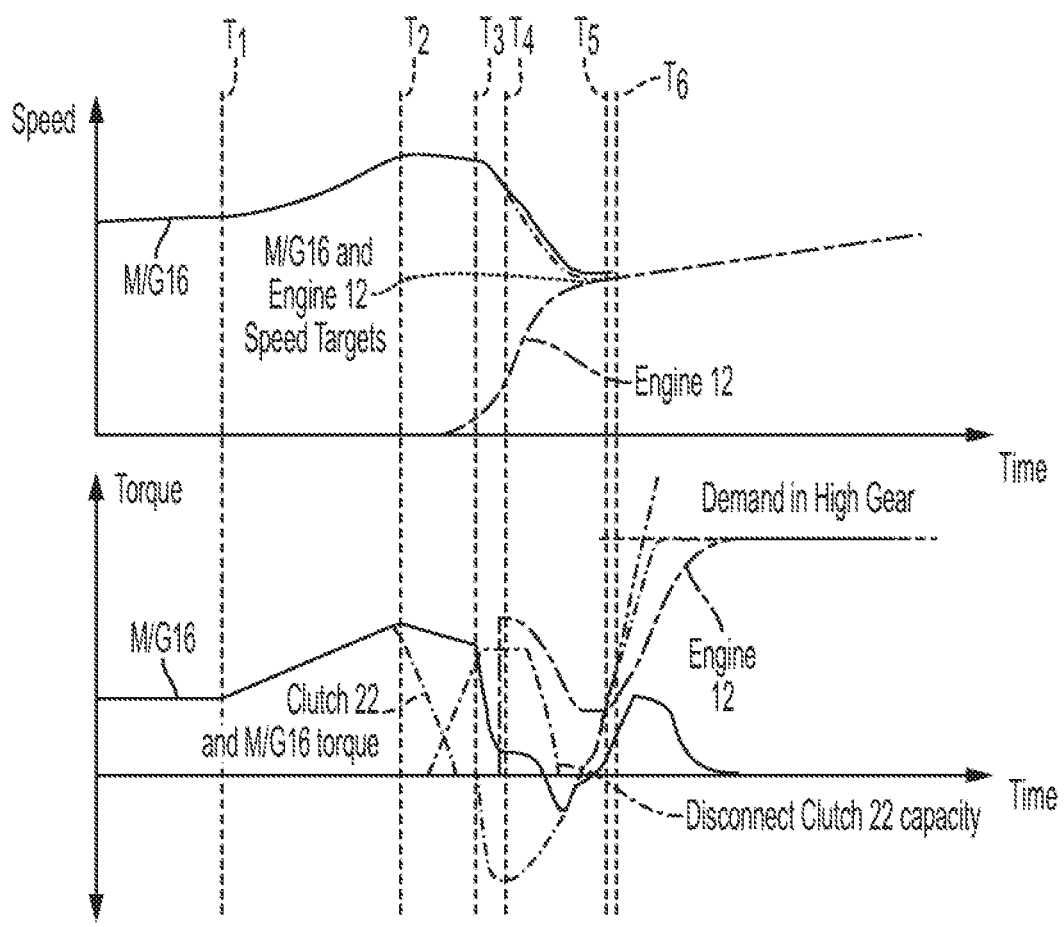
FIG. 2B is a control diagram illustrating another method for determining a coordinated engine start and transmission gear ratio upshift.

FIG. 2B illustrates a transmission upshift of the gearbox 18 according to another embodiment where the engine 12 is not operating and disconnect clutch 22 is disengaged. Prior to $T_1$ the HEV 10 may be propelled by torque provided by M/G 16 alone (i.e., EV mode). At $T_1$ the driver may begin to depress the accelerator pedal. As shown by the period between $T_1$ and $T_2$, the controller 38 may increase the torque output of the M/G 16. The controller 38 may monitor and determine if the torque demand exceeds an engine pull-up threshold (i.e., a threshold for when the engine should be started). At $T_2$, the controller 38 may determine the torque demand has exceeded the engine pull-up threshold and a coordinated engine start and transmission shift routine is executed.

As shown by the period between $T_2$ and $T_3$, the coordinated start and shift routine may decrease the torque of the MiG 16 and the disconnect clutch 22 torque capacity will be increased. The torque capacity of the disconnect clutch 22 is then used to begin cranking the engine 12. At $T_3$, the torque of M/G 16 has been reduced toward zero and the controller 38 will disengage the clutch 36 so that the input shaft 28 is disconnected from shaft 24. Once clutch 36 is disengaged, the gearbox 18 engages the new target gear and the controller 38 commands the M/G 16 into speed control. Once speed control has been entered, the controller 38 may set the speed target to the synchronous speed of the new target gear.

Between $T_2$ and $T_3$, the torque of the disconnect clutch 22 may begin to increase to generate enough torque and power to crank and generate a first combustion of the engine 12. First combustion is shown as occurring at $T_4$. Once the controller 38 has determined that the speeds of the engine 12 and M/G 16 are synchronized with the new target gear, the controller 38 may engage clutch 36 (as shown by $T_5$) and disconnect clutch 22 (as shown by $T_6$). It is contemplated that controller 38 may engage clutch 36 and disconnect clutch 22 at the same time or sequentially. For instance, controller 38 may engage clutch 36 first and then proceed to engage disconnect clutch 22. Or controller may engage disconnect clutch 22 and then proceed to engage clutch 36. Once controller 38 has engaged clutch 36, the torque of the engine 12 and MG 16 may be increased to begin delivering the driver demand.

Figure 3A:
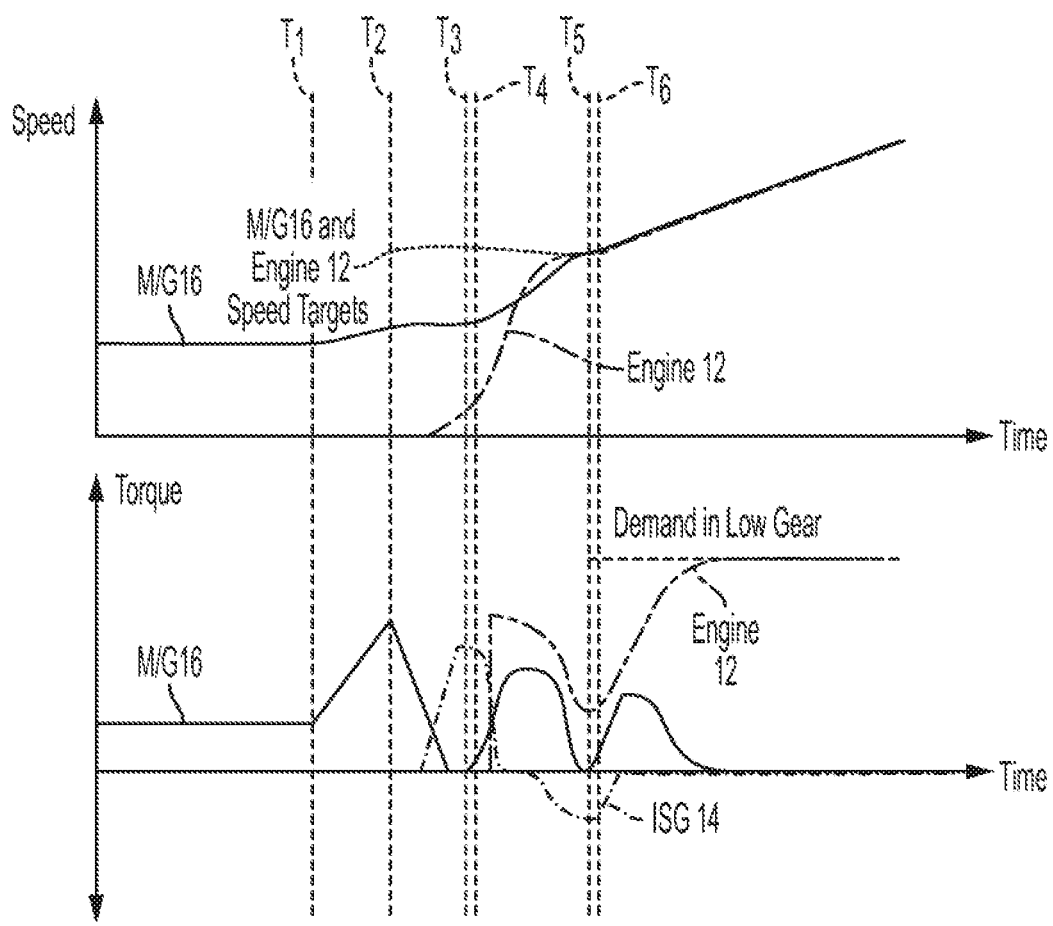
FIG. 3A is a control diagram illustrating a first method for determining a coordinated engine start and transmission gear ratio downshift.

FIG. 3A illustrates a transmission downshift of the gearbox 18 according to one embodiment where the engine 12 is again not operating and the disconnect clutch 22 is disengaged. Prior to $T_1$ the HEV 10 may again be propelled by torque provided by M/G 16 alone (i.e., EV mode). At $T_1$ the driver may begin to depress the accelerator pedal. As shown by the period between $T_1$ and $T_2$ the controller 38 may increase the torque output of M/G 16. The controller 38 may monitor and determine if the torque demand exceeds an engine pull-up threshold (i.e., a threshold for when the engine should be started). At $T_2$, the controller 38 may determine the torque demand has exceeded the engine pull-up threshold and a coordinated engine start and transmission shift routine is executed.

As shown by the period between $T^2$ and $T_3$, the coordinated start and shift routine may first decrease the torque of M/G 16 toward zero as quickly as possible as the driveline can handle and to reduce any noise-vibration-harshness (NVH) problems. As the torque of M/G 16 is reduced, power becomes available to crank the engine 12 using the ISG 14. In other words, the controller 38 may be able to crank the engine 12 with more torque/power because the torque of MIG 16 is being reduced to zero. At $T_3$, the torque of M/G 16 has been reduced to zero and the controller 38 will disengage the clutch 36 so that the input shaft 28 is disconnected from shaft 24. Once clutch 36 is disengaged, the gearbox 18 engages the new target gear and the controller 38 commands the M/G 16 into speed control. Once speed control has been entered, the controller 38 may set the speed target to the synchronous speed of the new target gear.

As is also shown by the period between $T_2$ and $T_3$, the torque of ISG 14 may begin to increase to generate enough torque and power to crank and generate a first combustion of the engine 12 within a short time period. First combustion is shown as occurring at $T_3$, and the controller 38 will then command the ISG 14 into speed control and the speed target of ISG 14 is also set to the synchronous speed of the new target gear of the gearbox 18. Since the engine 12 and ISG 14 can accelerate their combined inertia, the controller 38 can ensure that the engine 12 reaches the target speed at the same time the M/G 16 approximately reaches the target speed. Once the controller 38 has determined that the speeds of the engine 12, ISG 14, and M/G 16 are synchronized with the new target gear, the controller 38 may engage clutch 36 (as shown by T) and disconnect clutch 22 (as shown by $T_6$). It is again contemplated that controller 38 may engage clutch 36 and disconnect clutch 22 at the same time or sequentially. For instance, controller 38 may engage clutch 36 first and then proceed to engage disconnect clutch 22. Or controller may engage disconnect clutch 22 and then proceed to engage clutch 36. Once controller 38 has engaged clutch 36, the torque of the engine 12 and M/G 16 may be increased to begin delivering the driver demand.

Figure 3B:
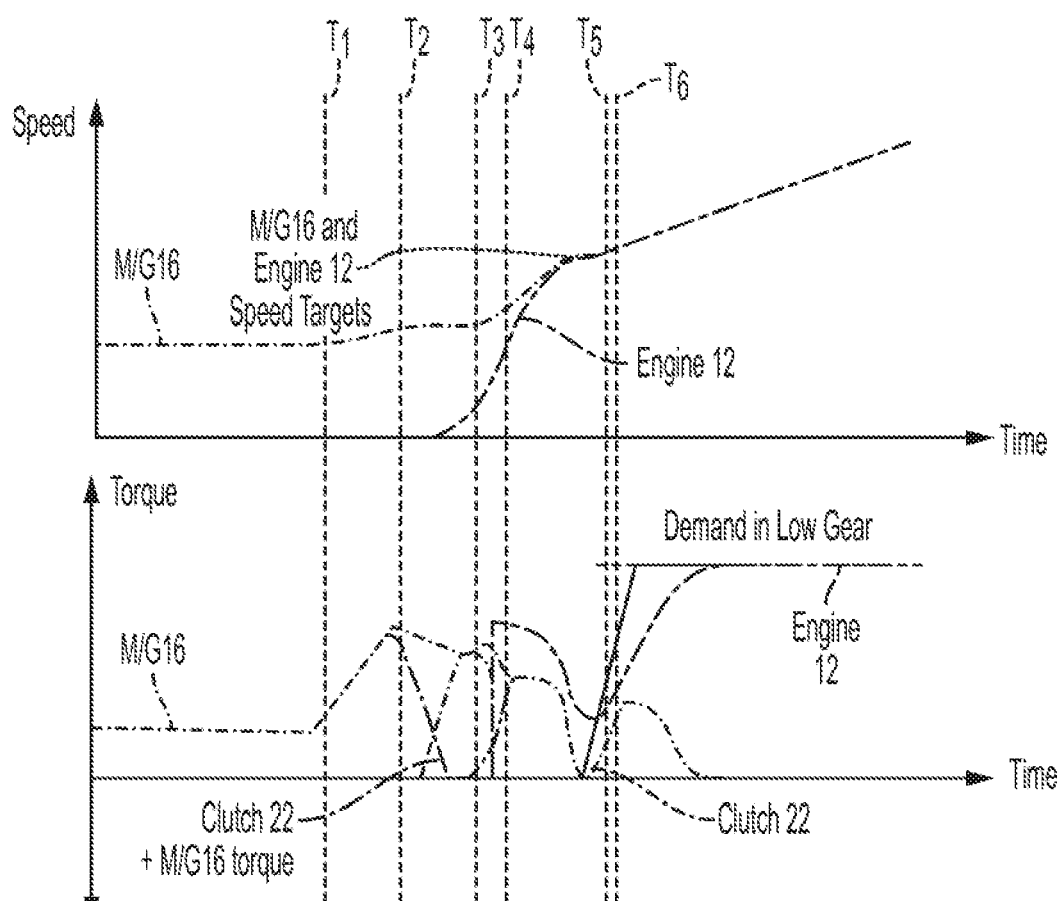
FIG. 3B is a control diagram illustrating another method for determining a coordinated engine start and transmission gear ratio downshift.

FIG. 3B illustrates a transmission downshift of the gearbox 18 according to another embodiment where the engine 12 is not operating and disconnect clutch 22 is disengaged. Prior to $T_1$ the HEV 10 may be propelled by torque provided by M/G 16 alone (i.e., EV mode). At $T_1$ the driver may begin to depress the accelerator pedal. As shown by the period between $T_1$ and $T_2$, the controller 38 may increase the torque output of the M/G 16. The controller 38 may monitor and determine if the torque demand exceeds an engine pull-up threshold (i.e., a threshold for when the engine should be started). At the controller 38 may determine the torque demand has exceeded the engine pull-up threshold and a coordinated engine start and transmission shift routine is executed.

As shown by the period between $T_2$ and $T_3$, the coordinated start and shift routine may decrease the torque of the M/G 16 and the disconnect clutch 22 torque capacity will be increased. The torque capacity of the disconnect clutch 22 is then used to begin cranking the engine 12. At $T_3$, the torque of M/G 16 has been reduced and the controller 38 will disengage the clutch 36 so that the input shaft 28 is disconnected from shaft 24. Once clutch 36 is disengaged, the gearbox 18 engages the new target gear and the controller 38 commands the M/G 16 into speed control. Once speed control has been entered, the controller 38 may set the speed target to the synchronous speed of the new target gear.

Between $T_2$ and $T_3$, the torque of the disconnect clutch 22 may begin to increase to generate enough torque and power to crank and generate a first combustion of the engine 12. First combustion is shown as occurring, around $T_4$. Once the controller 38 has determined that the speeds of the engine 12 and M/G 16 are synchronized with the new target gear, the controller 38 may engage clutch 36 (as shown by $T_1$) and disconnect clutch 22 (as shown by $T_6$). It is contemplated that controller 38 may engage clutch 36 and disconnect clutch 22 at the same time or sequentially. For instance, controller 38 may engage clutch 36 first and then proceed to engage disconnect clutch 22. Or controller may engage disconnect clutch 22 and then proceed to engage clutch 36.

Once controller 38 has engaged clutch 36, the torque of the engine 12 and M/G 16 may be increased to begin delivering the driver demand.

It is contemplated that the torque capability of the HEV 10 when the M/G 16 is operating alone (i.e., EV mode) may depend on several factors including: (1) the torque characteristics of M/G 16; (2) the torque ratios of gearbox 18; (3) the discharge power limit of the battery 20; (4) the starting power reserve of the engine 12; and (4) the speed of the HEV 10. Below a given motor speed, the torque capability of the IVFG 16 may be approximately constant. Above a given motor speed, the power capability of the M/G 16 may be approximately constant. There may also be a range of vehicle speeds for which the torque capability of the HEV 10 at the wheels 32 in low gear is equivalent to the torque capability of the HEV 10 at the wheels 32 in high gear. As more power is reserved for engine starting, this range of speeds becomes wider but the maximum torque capability when the M/G 16 is operating alone (i.e., EV mode) may decrease. To protect the motor hardware, the controller 38 might be required to upshift before the over-speed limit of M/G 16 is reached.

Figure 4:
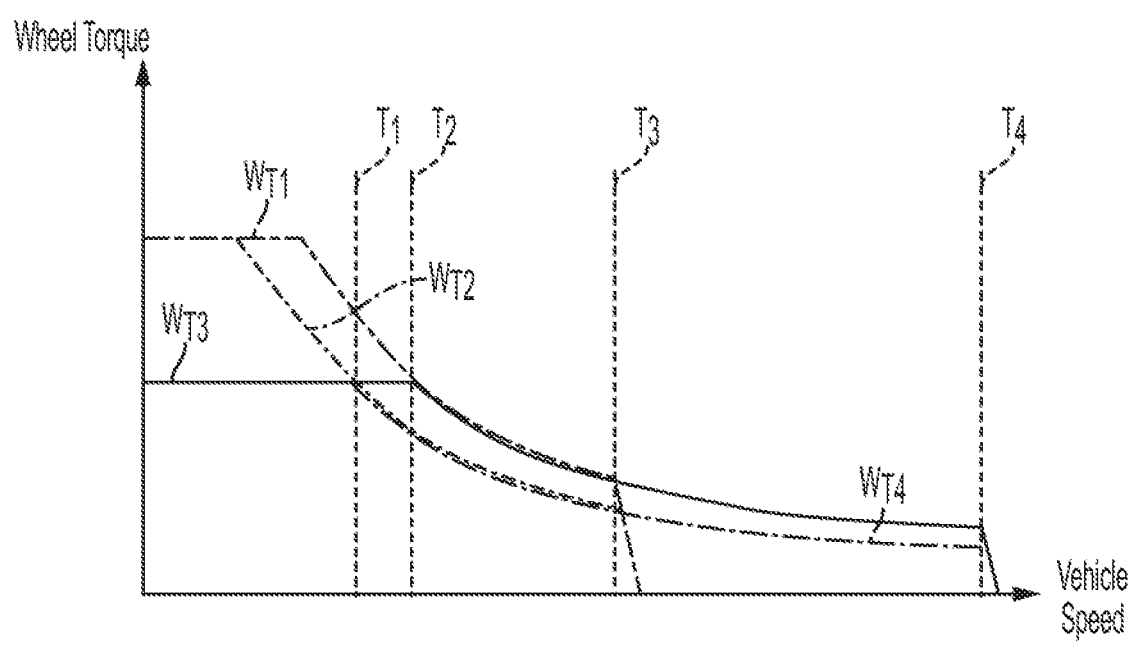
FIG. 4 is a graph illustrating the speed and torque characteristics of the hybrid vehicle during an engine starting routine and transmission shilling routine.

FIG. 4 is a graph illustrating how these factors may affect the maximum wheel torque capability of the HEV 10 when operating in EV mode. As illustrated, WTI represents the torque of the M/G 16 as seen at the wheels 32 (i.e., wheel torque) When the vehicle is operating EV mode and the gearbox 18 is positioned in low gear. $W_{T2}$ also represents the torque of the M/G 16 as seen at the wheels 32 (i.e., Wheel torque) when the vehicle is operating EV mode and the gearbox 18 is positioned in low gear. But the wheel torque of $W_{T2}$ begins to decrease at a lower vehicle speed than $W_{T1}$ so that there may be reserved power from the battery 20 to start the engine 12.

$W_{T3}$ represents the torque of the M/G 16 as seen at the wheels 32 (i.e., wheel torque) when the vehicle is operating EV mode and the gearbox 18 is positioned in high gear. $W_{T4}$ also represents the torque of the M/G 16 as seen at the wheels 32 (i.e., wheel torque) when the vehicle is operating EV mode and the gearbox 18 is positioned in high gear. But the wheel torque of $W_{T4}$ begins to decrease at a lower vehicle speed than $W_{T3}$ so that there may be reserved power from the battery 20 to start the engine 12.

The minimum speed for the M/G 16 with an equivalent low gear/high gear performance where there may be reserved power from the battery 20 to start the engine 12 is illustrated by $T_1$. The minimum speed for the M/G 16 with an equivalent low gear/high gear performance where there may not be reserved power from the battery 20 to start the engine 12 is illustrated by $T_2$. The maximum speed for the M/G 16 in low gear is illustrated by $T_3$. The maximum speed for the M/G 16 in high gear is illustrated by $T_4$.

It is contemplated that according to one embodiment the controller 38 may determine a minimum transmission shift point, a maximum transmission shift point and a desired transmission shift point. The minimum shift point may correspond to a high gear shaft speed sufficiently above the minimum idle speed of the engine. This minimum shift point may allow controller 38 from having to downshifting the gear ratio of gearbox 18 if the driver lifts off the accelerator pedal. The desired transmission shift point may be the optimal shift point and may be determined based on HEV 10 performance, drivability and fuel economy. The maximum shift point may be the highest vehicle speed before the controller 38 upshifts the gear ratio of the gearbox 18 while HEV 10 is operating in EV mode.

It is also contemplated that when the speed of HEV 40 is below the minimum upshift point during EV operation in low gear, the controller 38 may reserve power for starting the engine 12. When the speed of REV 10 is above the minimum upshift point during EV operation in low gear, the controller 38 may release the power reserve to maximize EV capability. If an engine start isn't requested before the speed of HEV 10 reaches the maximum shift point, the controller 38 may upshift the gearbox 18 to high gear and again requests an engine starting power reserve. If the speed of HEV 10 drops below a maximum EV downshift speed, the controller 3$ may stop reserving engine starting power. If the speed of the EV 10 drops below the minimum EV downshift point, then the controller 38 downshifts.

Figure 5:
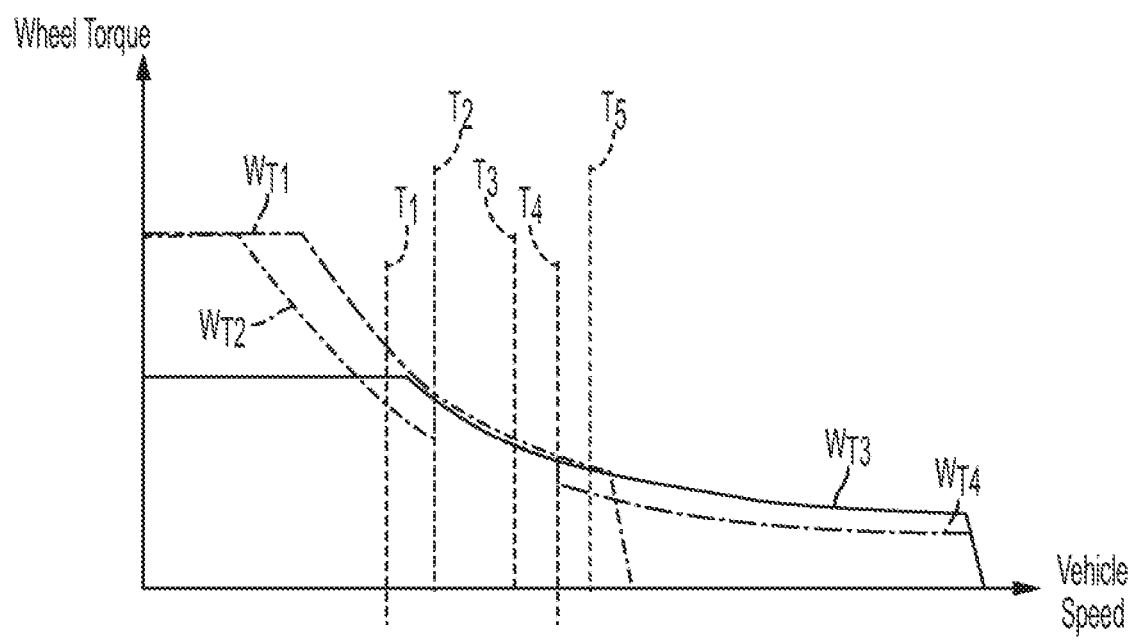
FIG. 5 is a graph illustrating the speed and torque characteristics of the hybrid vehicle during a coordinated engine starting routine and transmission shifting routine.

FIG. 5 is a graph illustrating how the controller 38 capability may change the torque capability of M/G 16 when starting of the engine 12 and gear ratio shifts of the gearbox 18 are jointly coordinated. As illustrated, $W_{T1}$ represents the torque of the M/G 16 as seen at the wheels 32 (i.e., wheel torque) when the vehicle is operating EV mode and the gearbox 18 is positioned in low gear. $W_{T2}$ also represents the torque of the NW 16 as seen at the wheels 32 (i.e., wheel torque) when the vehicle is operating EV mode and the gearbox 18 is positioned in low gear. But the wheel torque of $W_{T2}$ begins to decrease at a lower vehicle speed than Wu so that there may be reserved power from the battery 20 to start the engine 12. $W_{T3}$ represents the torque of the M/G 16 as seen at the wheels 32 (i.e., wheel torque) when the vehicle is operating EV mode and the gearbox 18 is positioned in high gear. $W_{T4}$ also represents the torque of the M/G 16 as seen at the wheels 32 (i.e., wheel torque) when the vehicle is operating EV mode and the gearbox 18 is positioned in high gear.

The minimum point for downshifting the gearbox 18 while operating in EV mode is illustrated by $T_1$. The minimum point for upshifting the gearbox 18 while operating in EV mode is illustrated by $T_2$. The desired point for upshifting the gearbox 18 while operating in EV mode is illustrated by $T_3$. The maximum point for downshifting the gearbox 18 while operating in EV mode is illustrated by $T_4$. And the maximum point for upshifting the gearbox 18 while operating in EV mode is illustrated by $T_5$.

Figure 6A:
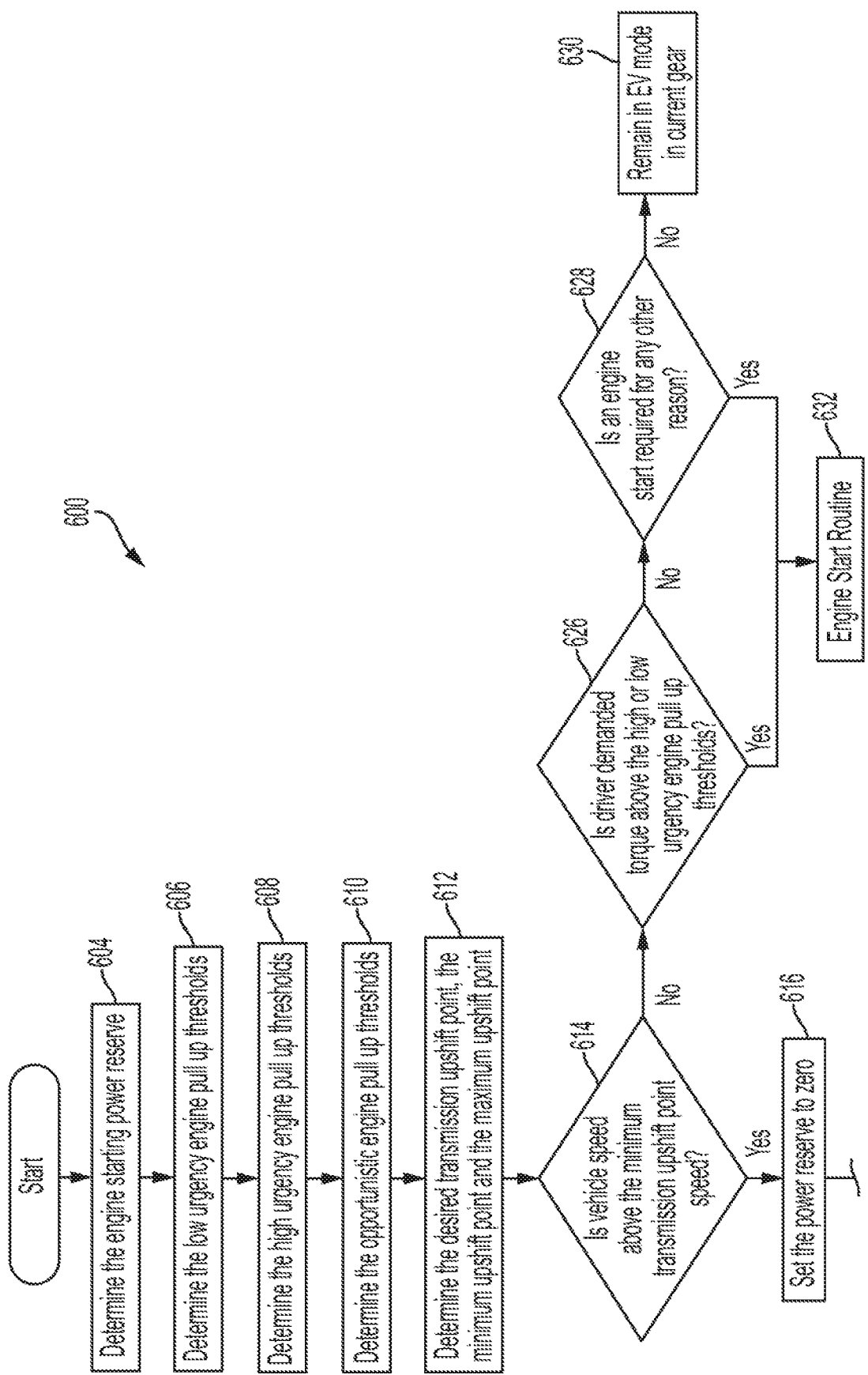
FIGS. 6A-6C are a control diagram illustrating a method for determining when to jointly or independently execute an engine starting routine and transmission gearbox upshifting routine.
Figure 6B:
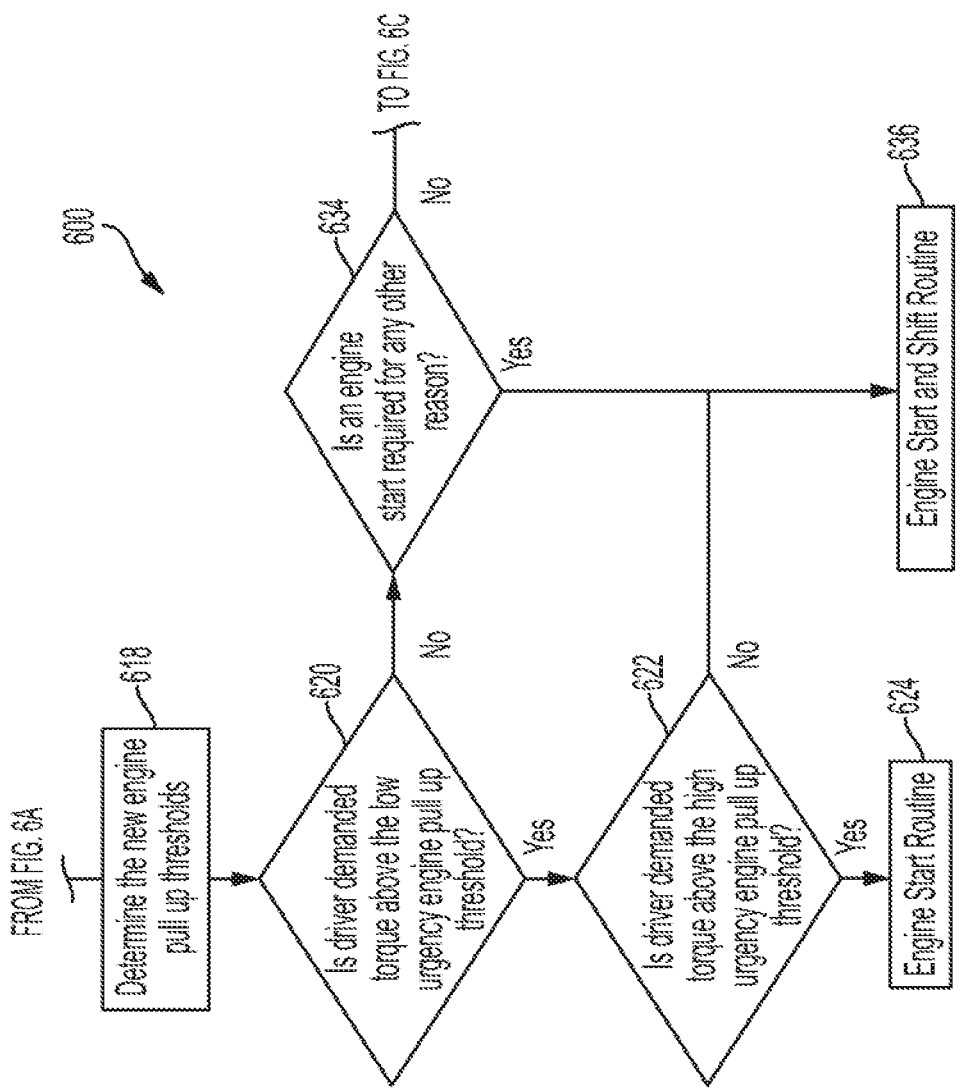
Figure 6C:
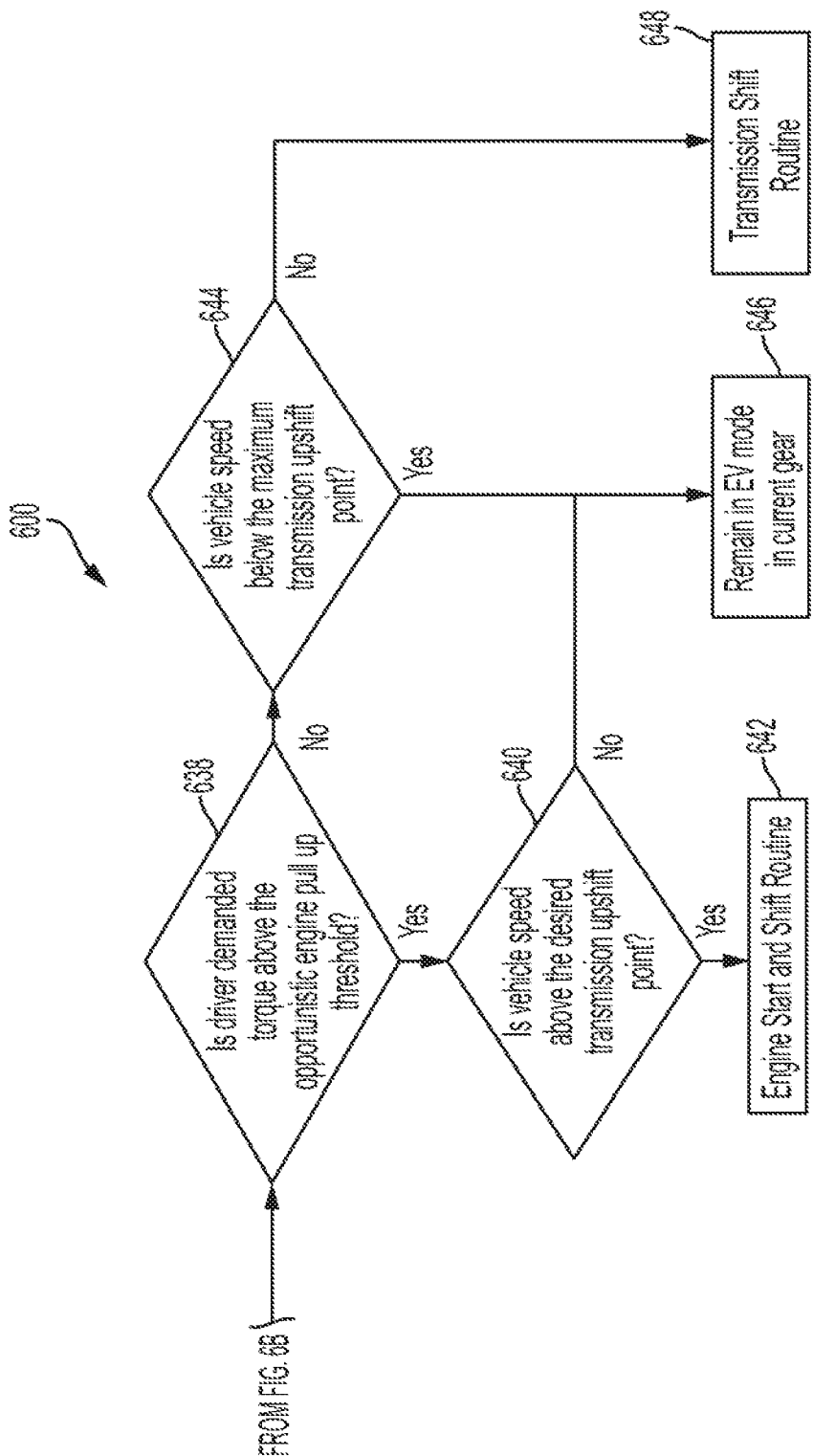

FIG. 6 illustrates a flow diagram 600 that may be executed by controller 38 to determine: (1) a coordination between starting the engine 12 and upshifting the gear ratio of the gearbox 18; (2) starting the engine 12 alone; (3) upshifting the gear ratio of the gearbox 18 alone; or (4) continuing to operate the HEV 10 in EV mode without any further gear ratio changes. At step 604, the controller 38 determines an amount of power reserve needed for starting the engine 12. At step 606 a low urgency EPL threshold is determined. At step 608, a high urgency ETU threshold is determined. At step 610 an opportunistic EPL threshold is determined. At step 612, the controller 38 next determines the desired transmission upshift point for the gearbox 18, minimum upshift point of the gearbox 18, and the maximum upshift point of the gearbox 18. Controller 38 may calculate each of these shiftpoints, or controller 38 may use a stored data table for determining these shiftpoints. For instance, controller 38 may store a data table like the graph illustrated by FIG. 5, and controller 38 may then use the stored data table for determining each of the shiftpoints.

At step 614, the controller determines whether the current speed of the HEV 10 is above the minimum transmission upshift point. If yes, flow diagram 600 proceeds to step 616 where the power reserve for starting the engine 12 is set to zero. At step 618, the controller 38 may update the low urgency, high urgency, and opportunistic engine pull-up thresholds. At step 620, the controller 38 will determine if the torque being demanded by the driver (driver demanded torque) is above the low urgency engine pull-up threshold. If yes, flow diagram 600 proceeds to step 622 where the controller determines if the driver demanded torque is above the high urgency engine pull-up threshold. If yes, flow diagram 600 proceeds to step 624 where an engine starting routine is executed. If step 622 is not true, flow diagram 600 proceeds to step 636 where an engine start and gear ratio (i.e., transmission) shift is executed.

If the controller determines step 620 is not true, flow diagram will proceed to step 634 where the controller 38 determines if there are other reasons that require: the engine 12 to be started. For instance, the controller may determine that the engine 12 needs to be started due to a low state-of-charge (SOC) of the battery 20 or because the driver has activated the heating or cooling system of the HEV 10. If the controller determines step 634 to be true, flow diagram 600 proceeds to step 636 where an engine start and gear ratio (i.e., transmission) shift is executed. If the controller determines step 634 is not true, flow diagram proceeds to step 638 where the controller 38 determines if the driver demanded torque is above the opportunistic engine pull-up threshold. If yes, the controller proceeds to step 640 where the controller 38 determines if the speed of the HEV 10 is above the desired transmission upshift point. If yes, flow diagram 600 proceeds to step 636 where an engine start and gear ratio (i.e., transmission) shift is executed. If controller 38 determines step 640 is not true, flow diagram 600 proceeds to step 646 where the controller 38 keeps operating the HEV 10 in the EV mode of operation and no gear ratio shift is executed.

If step 638 was determined not to be true, flow diagram proceeds to step 644 where controller 38 determines if the speed of the HEV 10 is below the maximum transmission upshift point. If yes, the controller 38 keeps operating the HEV 10 in the EV mode of operation and no gear ratio shill is executed. If no, the controller 38 will execute a transmission gear ratio shill routine and the engine is not started.

If the controller 38 determined that step 614 was not true, the flow diagram 600 would proceed to step 626 where the controller 38 determines if the driver demanded torque is above the high or low urgency pull-up thresholds. If yes the controller 38 will execute the engine starting routine. If no, flow diagram 600 proceeds to step 628 where the controller 38 determines if starting of the engine 12 is necessary: for any other reasons. Again, the engine 12 may need to be started due to a low SOC of the battery 20 or because the driver has activated the heating or cooling systems of the HEV 10. If step 628 is true, the controller 38 will execute the engine starting routine. If step 628 is not true, the controller 38 keeps operating the HE 10 in the EV mode of operation and no gear ratio shift is executed.

Figure 7A:
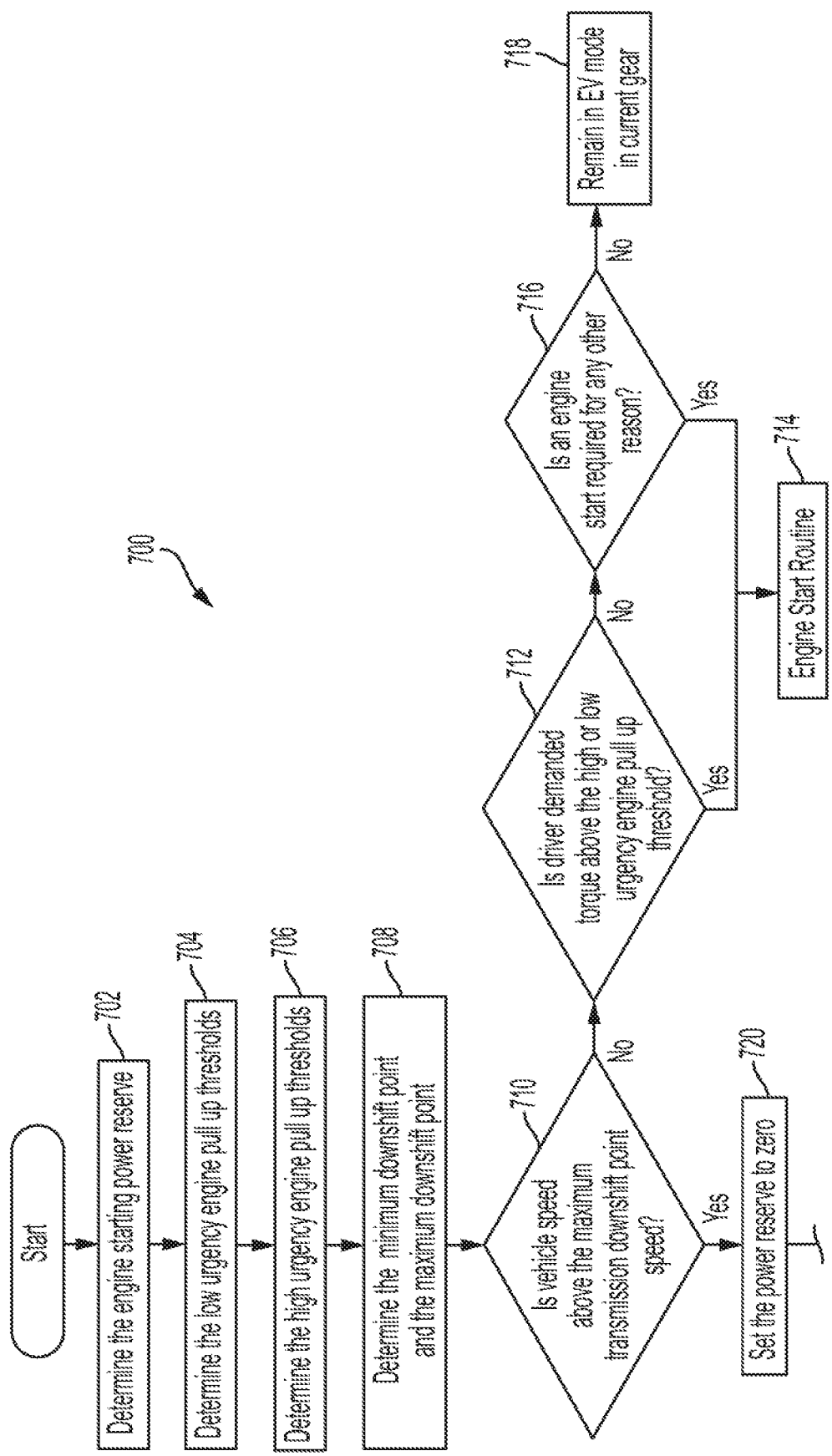
FIGS. 7A-7B are a control diagram illustrating, a method for determining when to jointly or independently execute an engine starting routine and transmission gearbox downshifting routine.
Figure 7B:
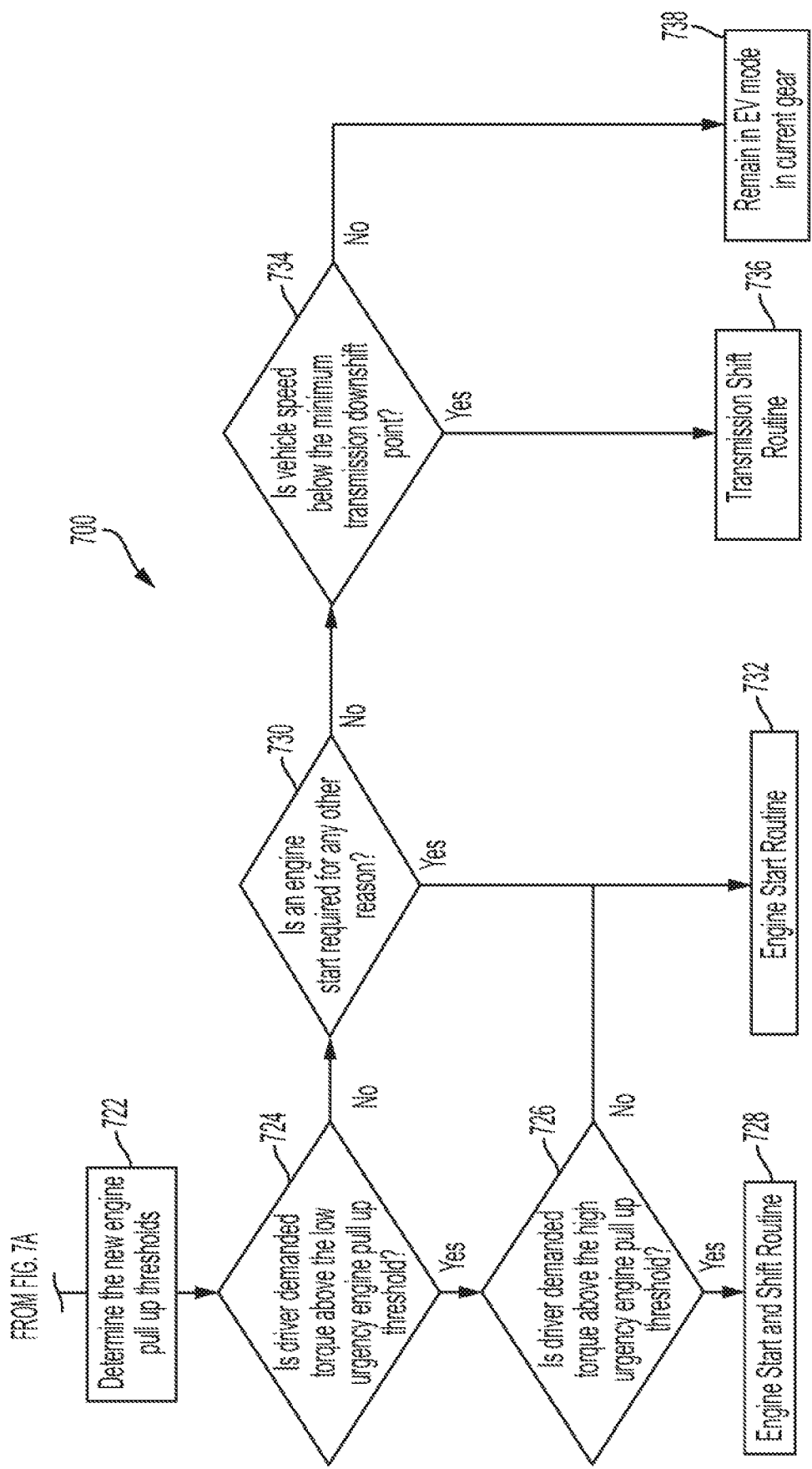

FIG. 7 illustrates a flow diagram 700 that may be executed by controller 38 to determine: (1) a coordination between starting the engine 12 and downshifting the gear ratio of the gearbox 18; (2) starting the engine 12 alone; (3) downshifting the gear ratio of the gearbox 18 alone; or (4) continuing to operate the HEV 10 in EV mode without any further gear ratio changes. At step 702, the controller 38 determines an amount of power reserve needed for starting the engine 12. At step 704 a low urgency EPU threshold is determined. At step 706, a high urgency EPU threshold is determined. At step 708, the controller 38 next determines the minimum downshift point and the maximum downshift point for the gearbox 18. Controller 38 may calculate each of these shift points, or controller 38 may use a stored data table for determining these shift points. For instance, controller 38 may store a data table like the graph illustrated by FIG. 5, and controller 38 may then use the stored data table for determining each of the shift points.

At step 710, the controller determines whether the current speed of the HEV 10 is above the maximum transmission downshift point. If yes, flow diagram 700 proceeds to step 720 where the power reserve for starting the engine 12 is set to zero. At step 722, the controller 38 may update the low urgency and high urgency engine pull-up thresholds. At step 724, the controller 38 will determine if the torque being demanded by the driver (driver demanded torque) is above the low urgency engine pull-up threshold. If yes, flow diagram 700 proceeds to step 726 where the controller 38 determines if the driver demanded torque is above the high urgency engine pull-up threshold. If yes, flow diagram 700 proceeds to step 728 where an engine starting and gear ratio (i.e., transmission) shift is executed routine is executed. If step 726 is not true, flow diagram 700 proceeds to step 732 where an engine start routine is executed.

If the controller determines step 724 is not true, flow diagram will proceed to step 730 where the controller 38 determines if there are other reasons that require the engine 12 to be started. For instance, the controller may determine that the engine 12 needs to be started due to a low state-of-charge (SOC) of the battery 20 or because the driver has activated the heating or cooling system of the HEV 10. If the controller determines step 730 to be true, flow diagram 700 proceeds to step 732 where an engine start routine is executed.

If the controller determines step 730 is not true, flow diagram 700 proceeds to step 734 where the controller 38 determines if the speed of the HEV 10 is below the minimum transmission downshift point. If yes, flow diagram 700 proceeds to step 736 where a gear ratio (i.e., transmission) shift is executed. If controller 38 determines step 734 is not true, flow diagram 700 proceeds to step 738 where the controller 38 keeps operating the REV 10 in the EV mode of operation and no gear ratio shift is executed.

If the controller 38 determined that step 710 was not true, the flow diagram 700 would proceed to step 712 where the controller 38 determines if the driver demanded torque is above the high or low urgency pull-up thresholds. If yes, the controller 38 will execute the engine starting routine. If no, flow diagram 700 proceeds to step 716 where the controller 38 determines if starting of the engine 12 is necessary for any other reasons. Again, the engine 12 may need to be started due to a low SOC of the battery 20 or because the driver has activated the heating or cooling systems of the HEV 10. If step 716 is true, the controller 38 will execute the engine starting routine. If step 716 is not true, the controller 38 keeps operating the HEV 10 in the EV mode of operation and no gear ratio shift is executed.

Figure 8:
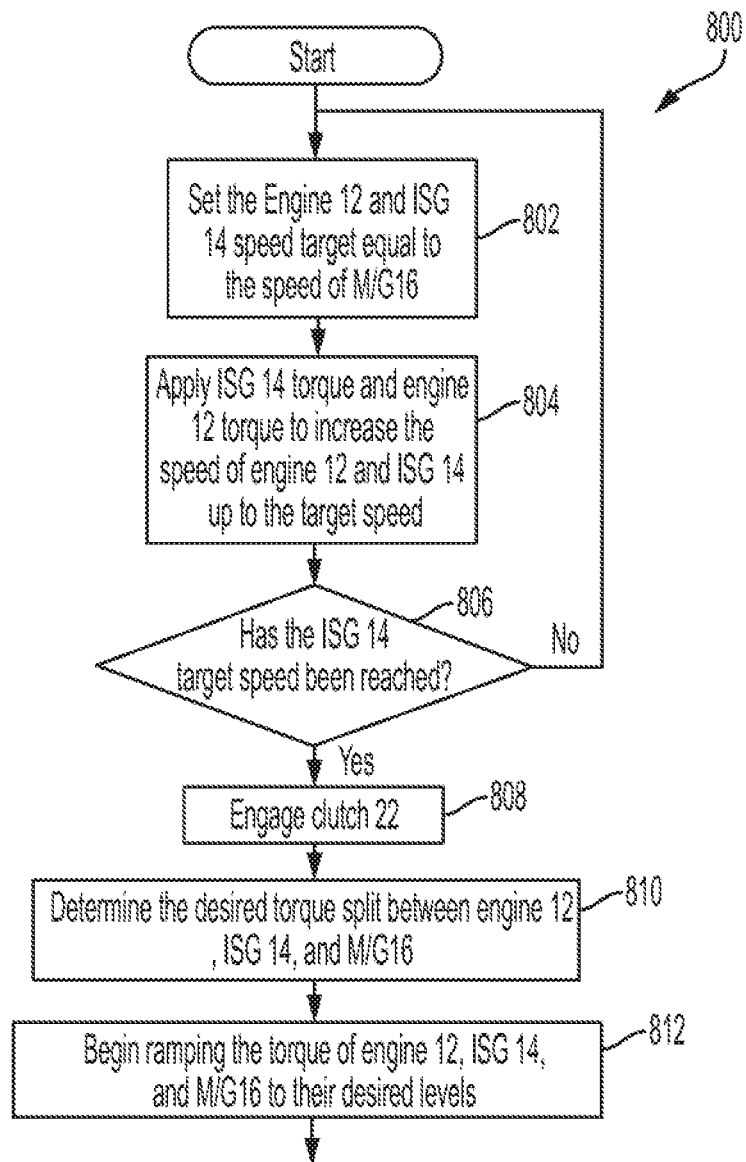
FIG. 8 is a control diagram illustrating a method for executing an engine starting routine.

FIG. 8 illustrates a flow diagram 800 of an engine start routine that may be executed based on the logic of flow diagram 600 (FIG. 6) or flow diagram 700 (FIG. 7). The engine start routine begins at step 802 where the speed of the engine 12 and the ISG 14 is set equal to the speed of M/G 16. At step 804, the controller 38 may increase the speed of the engine 12 and ISG 14 up to the established target speed by increasing the torque output of the engine 12 and ISG 14. At step 806 the controller may determine if the ISG 14 has reached the target speed. If no, the flow diagram returns to step 802. If yes, flow diagram 800 proceeds to step 808 where the controller 38 will engage the disconnect clutch 22. Flow diagram then proceeds to step 810 where the controller 38 will determine the desired torque split between the engine 12, ISG 14, and M/G 16 to satisfy the driver demanded torque. Flow diagram 800 then proceeds to step 812 where the controller 38 will modify the torque output of the engine 12, ISG 14, and M/G 16 to satisfy the driver demanded torque.

Figure 9:
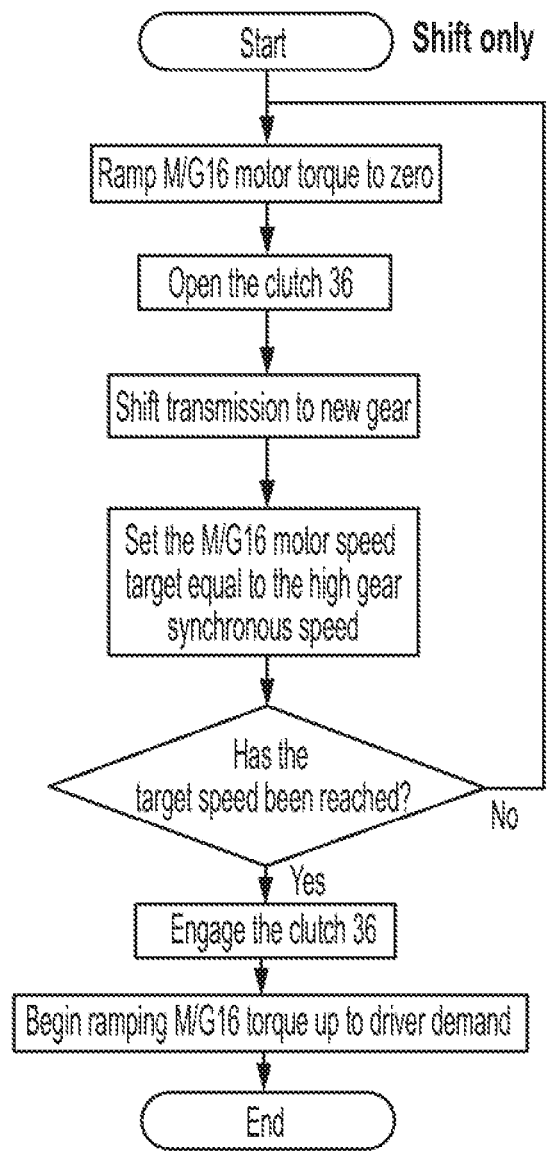
FIG. 9 is a control diagram illustrating, a method for executing a transmission gearbox shifting routine.

FIG. 9 illustrates a flow diagram 900 of a gear ratio shift routine as used routine that may be executed during the flow diagram 600 (FIG. 6) or flow diagram 700 (FIG. 7). The gear ratio shift routine begins at step 902 where the controller 38 may decrease the torque of M/G 16 toward zero. At step 904, the controller 38 may disengage clutch 36. At step 904 the controller 38 may shift the gear ratio of gearbox 18. At step 906 the controller 38 may set the target speed of the M/G 16 equal to the high gear synchronous speed. At step 908, the controller may determine if the HEV 10 has reached the target speed. If the HEV 10 has not reached the target speed, flow diagram 900 returns to step 902. If the HEV 10 has reached the target speed, flow diagram 900 proceeds to step 910 and controller 38 will engage clutch 36. Flow diagram 900 then proceeds to step 912 and the controller 38 begins to increase the torque of M/G 16 to match the torque requested by the driver (i.e., driver demanded torque).

Figure 10:
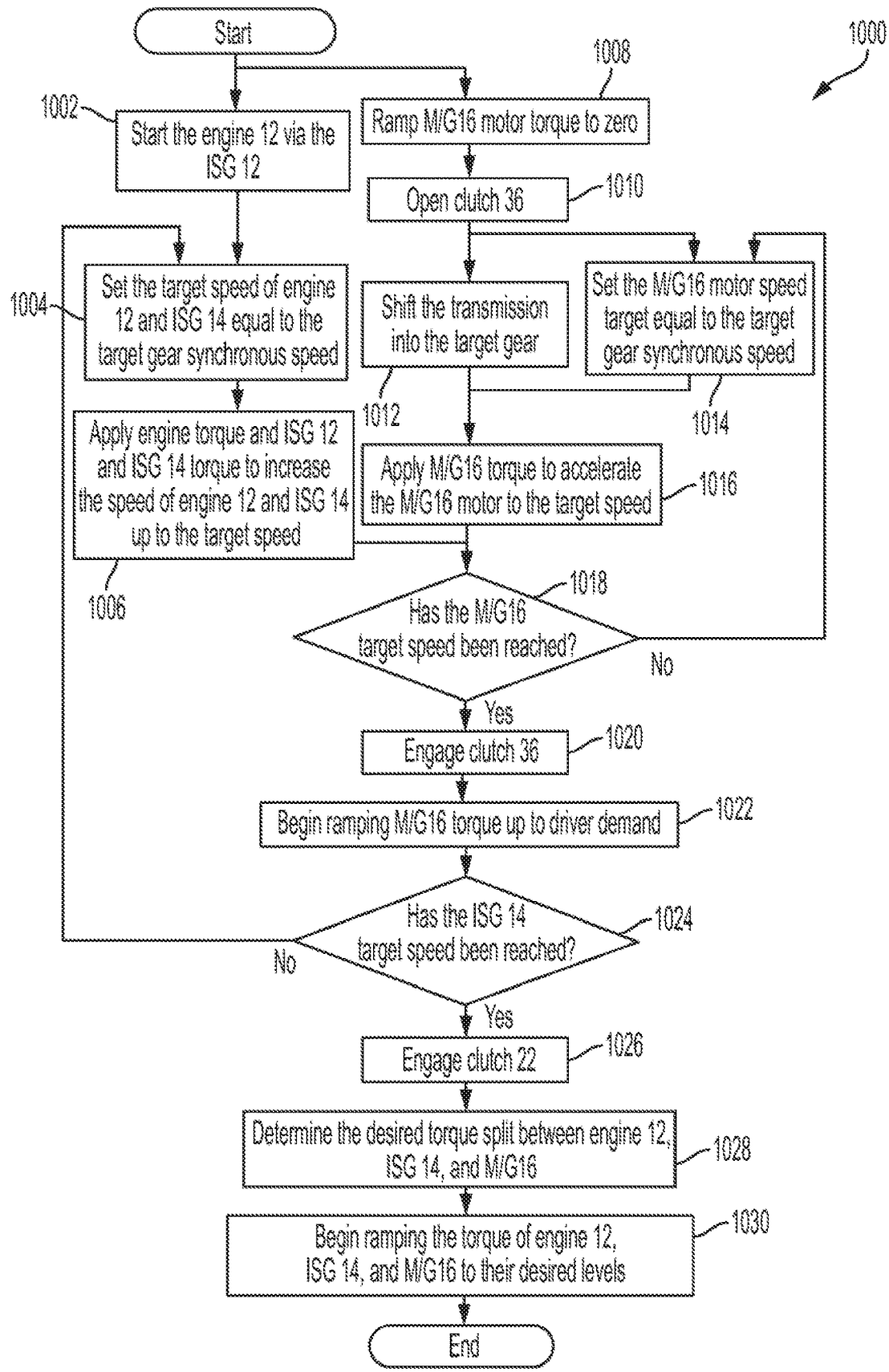
FIG. 10 is a control diagram illustrating a method for executing an engine starting routine and transmission gearbox shifting routine.

FIG. 10 illustrates a flow diagram 1000 of a parallel engine start and gear ratio shill routine that may be executed during the flow diagram 600 (FIG. 6) and flow diagram 700 (FIG. 7). While the steps of flow diagram 1000 may be described in a sequential fashion, it is contemplated that controller 38 may execute steps 1002-1006 and steps 1008-1016 in parallel so that some of the steps (e.g., steps 1002 and 1008) may be executed at or near the same time.

At step 1002, the controller 38 will use the ISG 14 to start the engine 12. At step 1004 controller will adjust the speed of the engine 12 and ISG 14 to match the target gear synchronous speed. At step 1006, the controller 38 may adjust the torque of the engine 12 and ISG 14 to adjust the speed of the engine 12 and ISG 14. While steps 1002-1006 are being executed, the controller 38 may also execute step 1008 where the torque of M/G 16 is adjusted to zero. At step 1010, the controller 38 will disengage clutch 36 to disconnect shaft 24 from the input shaft 28. At step 1012, the controller 38 will shift the target gear ratio of the gearbox 18. At step 1014, the controller 38 will set the target speed of M/G 16 equal to the target gear synchronous speed. At step 1016, the controller 38 will adjust the torque of MIG 16 until the speed of MIG 16 adjusts the target speed.

At step 1018, the controller 38 will determine if the target speed of M/G 16 has been reached. If no, flow diagram 1000 will return to step 1014. If yes, flow diagram 1000 will proceed to step 1020 where the controller 38 will engage clutch 36. At step 1022, the controller will begin ramping the torque of MIG 16 to match the torque being requested by the driver (i.e., driver demanded torque). Flow diagram 100 then proceeds to step 1024 where the controller 38 will determine if the speed of the ISG 14 is approximately equal to the ISG target speed. If no, flow diagram 1000 returns to step 1002. If yes, flow diagram 1000 proceeds to step 1026 where the controller 38 will engage the disconnect clutch 22. At step 1028, the controller 38 will determine the amount of torque that should be applied by the engine 12, ISG 14, and the M/Ci 16. At step 1030, the controller 38 will begin adjusting the torque of the engine 12, ISG 14, and MIG 16 to meet the driver demand.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A control system for a hybrid vehicle, comprising:
a coaxially arranged engine, starter-generator, motor, and transmission gearbox;
a disconnect clutch between the starter-generator and motor;
a second clutch between the motor and transmission gearbox; and
a controller configured to,
responsive to a command to shift the transmission gearbox and start the engine, decrease a torque of the motor and operate the starter-generator to start the engine,
responsive to the torque of the motor achieving zero, disengage the second clutch and subsequently shift the transmission gearbox to a target gear ratio speed,
responsive to completion of the shift, increase respective torques of the motor, starter-generator, and engine to drive a speed of the motor, starter-generator, and engine toward a target speed defined by the target gear ratio speed,
responsive to the speed of the motor achieving the target speed, engage the second clutch,
responsive to the respective speeds of the starter-generator and engine achieving the target speed, engage the disconnect clutch,
responsive to a vehicle speed being above a minimum transmission upshift value, reduce a power reserved by a vehicle battery to charge the engine,
responsive to a driver demanded torque being below an engine pull-up threshold and the vehicle speed being below a maximum transmission upshift value, command the motor to propel the vehicle alone, and
responsive to the driver demanded torque being below the engine pull-up threshold and the vehicle speed being above the maximum transmission upshift value, command the transmission gearbox be shifted.

2. The control system of claim 1, wherein responsive to the disconnect clutch being engaged, adjust the torque of the engine, the starter-generator, and the motor to satisfy the driver demanded torque.

3. The control system of claim 1, wherein the second clutch is a dog clutch.

4. The control system of claim 1, wherein the controller is further configured to,
responsive to the command to start the engine, adjust the speed of the engine and starter-generator toward the speed of the motor, and
responsive to the engine and starter-generator achieving the speed of the motor, engage the disconnect clutch.

5. The control system of claim 1, wherein the controller is further configured to,
responsive to the driver demanded torque being above the engine pull-up threshold, command the engine be started.

6. The control system of claim 1, wherein the controller is further configured to,
responsive to the vehicle speed being below a maximum transmission downshift value and responsive to the driver demanded torque being above the engine pull-up threshold, command the engine be started.

7. The control system of claim 1, wherein the controller is further configured to,
responsive to the vehicle speed being below a maximum transmission downshift value and responsive to the driver demanded torque being below the engine pull-up threshold, command the motor alone propel the vehicle.

8. The control system of claim 1, wherein the controller is further configured to,
responsive to the vehicle speed being above a maximum transmission downshift value, reduce the power reserved by the vehicle battery to charge the engine, and
responsive to the driver demanded torque being above the engine pull-up threshold, command the engine be started and the transmission gearbox be shifted.

9. The control system of claim 1, wherein the controller is further configured to,
responsive to the vehicle speed being above a maximum transmission downshift value, reduce the power reserved by the vehicle battery to charge the engine.

10. The control system of claim 1, wherein the controller is further configured to,
responsive to the vehicle speed being above a maximum transmission downshift value, reduce the power reserved by the vehicle battery to charge the engine, and
responsive to the driver demanded torque being below the engine pull-up threshold and responsive to the vehicle speed being below a minimum transmission downshift value, command the transmission gearbox be shifted.

11. The control system of claim 1, wherein the controller is further configured to,
responsive to the vehicle speed being above a maximum transmission downshift value, reduce the power reserved by the vehicle battery to charge the engine, and
responsive to the driver demanded torque being below the engine pull-up threshold and responsive to the vehicle speed being above a minimum transmission downshift value, command the motor to propel the vehicle.

12. The control system of claim 1, wherein the controller is further configured to,
responsive to the vehicle speed being above a maximum transmission downshift value and responsive to the driver demanded torque being above the engine pull-up threshold, command the engine be started.

13. The control system of claim 1, wherein the controller is further configured to,
responsive to the vehicle speed being above a maximum transmission downshift value and responsive to the driver demanded torque being below the engine pull-up threshold, command the motor alone propel the vehicle.

14. A control system for a hybrid vehicle, comprising:
a coaxially arranged engine, motor, and transmission gearbox;
a disconnect clutch between the engine and motor;
a second clutch between the motor and transmission gearbox; and a controller configured to,
    responsive to a command to shift the transmission gearbox and start the engine, decrease a torque of the motor and begin engaging the disconnect clutch to start the engine,
    responsive to the engine being started, disengage the disconnect clutch,
    responsive to the torque of the motor being reduced, disengage the second clutch and subsequently shift the transmission gearbox to a target gear ratio speed,
    responsive to completion of the shift, increase respective torques of the motor and engine to drive a speed of the motor and engine toward a target speed defined by the target gear ratio speed,
    responsive to the speed of the motor achieving the target speed, engage the second clutch, and
    responsive to the respective speeds of the engine achieving the target speed, engage the disconnect clutch,
    responsive to a vehicle speed being above a minimum transmission upshift value, reduce a power reserved by a vehicle battery to charge the engine,
    responsive to a driver demanded torque being below an engine pull-up threshold and the vehicle speed being below a maximum transmission upshift value, command the motor to propel the vehicle alone, and
    responsive to the driver demanded torque being below the engine pull-up threshold and the vehicle speed being above the maximum transmission upshift value, command the transmission gearbox be shifted.

15. A control method for a hybrid vehicle, comprising:
decreasing a torque of a motor and operating a starter-generator to start an engine responsive to a command to shift a transmission gearbox and start the engine;
disengaging a second clutch located between the motor and transmission gearbox and subsequently shifting the transmission gearbox to a target gear ratio speed responsive to the torque of the motor achieving zero;
increasing respective torques of the motor, starter-generator, and engine to drive a speed of the motor, starter-generator, and engine toward a target speed defined by the target gear ratio speed responsive to completion of the shift;
engaging the second clutch responsive to the speed of the motor achieving the target speed;
engaging a disconnect clutch located between the starter-generator and motor responsive to the respective speeds of the starter-generator and engine achieving the target speed;
reducing a power reserved by a vehicle battery to charge the engine responsive to a vehicle speed being above a minimum transmission upshift value;
commanding the motor to propel the vehicle alone responsive to a driver demanded torque being below an engine pull-up threshold and the vehicle speed being below a maximum transmission upshift value; and
commanding the transmission gearbox be shifted responsive to the driver demanded torque being below the engine pull-up threshold and the vehicle speed being above the maximum transmission upshift value.

16. The control method of claim 15, further comprising:
adjusting the speed of the engine and starter-generator toward the speed of the motor responsive to the command to start the engine; and
engaging the disconnect clutch responsive to the engine and starter-generator achieving the speed of the motor.

* * * * *